(12) United States Patent
Kaas et al.

(10) Patent No.: US 7,204,533 B2
(45) Date of Patent: Apr. 17, 2007

(54) ANIMAL FAECES COLLECTOR DEVICE

(75) Inventors: Erik Kaas, Nyborg (DK); Henning Pedersen, Veile (DK)

(73) Assignee: Venture One (IP) Limited, Glasgow (GB)

( * ) Notice: Subject to any disclaimer, the term of this patent is extended or adjusted under 35 U.S.C. 154(b) by 0 days.

(21) Appl. No.: 10/562,210

(22) PCT Filed: Jun. 24, 2004

(86) PCT No.: PCT/GB2004/002734

§ 371 (c)(1),
(2), (4) Date: Dec. 22, 2005

(87) PCT Pub. No.: WO2005/000016

PCT Pub. Date: Jan. 6, 2005

(65) Prior Publication Data

US 2006/0145492 A1    Jul. 6, 2006

(30) Foreign Application Priority Data

Jun. 26, 2003    (GB)    ................ 0314921.8

(51) Int. Cl.
*A01K 29/00*    (2006.01)
*E01H 1/12*    (2006.01)

(52) U.S. Cl. .................... 294/1.5; 294/119.3

(58) Field of Classification Search .......... 294/1.3–1.5, 294/119.3; 15/257.4, 257.7, 257.8, 257
See application file for complete search history.

(56) References Cited

U.S. PATENT DOCUMENTS

| 3,977,422 | A | * | 8/1976 | Cabaluna | ................ | 294/1.4 |
| 4,003,595 | A | * | 1/1977 | Fano et al. | ................ | 294/1.5 |
| 4,185,861 | A | | 1/1980 | Berner | | |
| 4,852,924 | A | * | 8/1989 | Ines | ................ | 294/1.5 |
| 5,758,917 | A | * | 6/1998 | Langley | ................ | 294/1.5 |

FOREIGN PATENT DOCUMENTS

WO    WO 96/07317 A    3/1996

* cited by examiner

*Primary Examiner*—Dean J. Kramer
(74) *Attorney, Agent, or Firm*—Young & Basile, P.C.

(57) ABSTRACT

The present invention relates to a collapsible animal faeces collector device (1) having a handle portion (2) and a receptacle support (6), supporting a receptacle (8) with an upwardly facing surface (10) for receiving a faecal deposit (24). The device (1) is of a lightweight construction, the handle (2) and receptacle support (6) have just sufficient strength to bear in cantilevered support an empty receptacle (8) for manipulation into a faeces-receiving position on the ground below an animal's anus, but insufficient strength to bear in cantilevered support a receptacle (8) loaded with faeces. The receptacle (8), when empty, is supported equally around the receptacle support (6) by a rim portion (12). When the device (1) loaded with faeces (24) is suspended, the rim portion (12) moves on the receptacle support (6) to collect together over the contents of the receptacle (8). The handle portion and receptacle support are preferably inflatable.

9 Claims, 1 Drawing Sheet

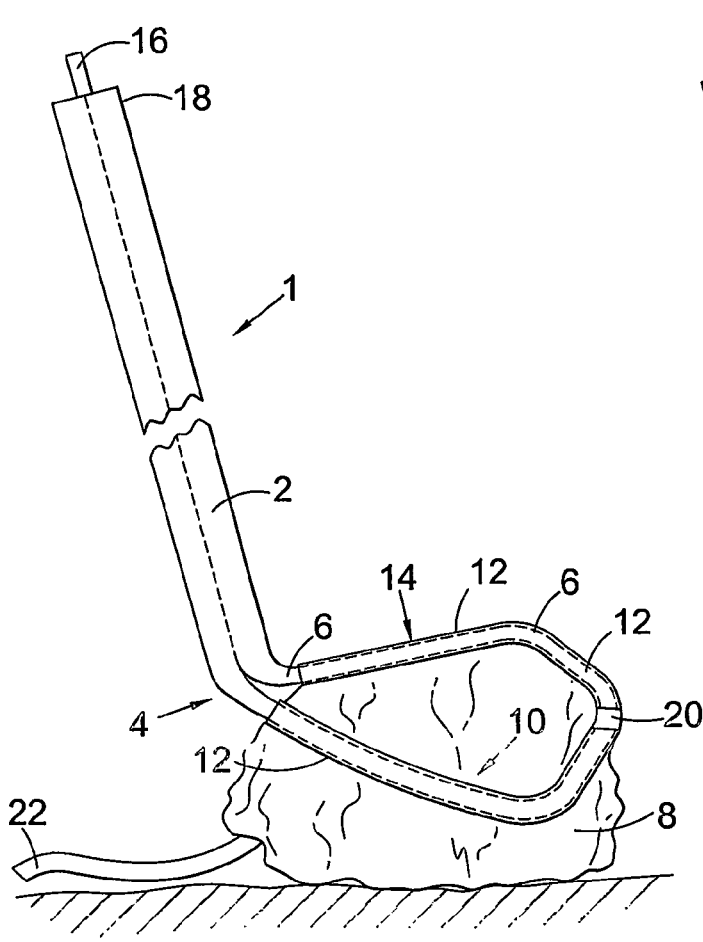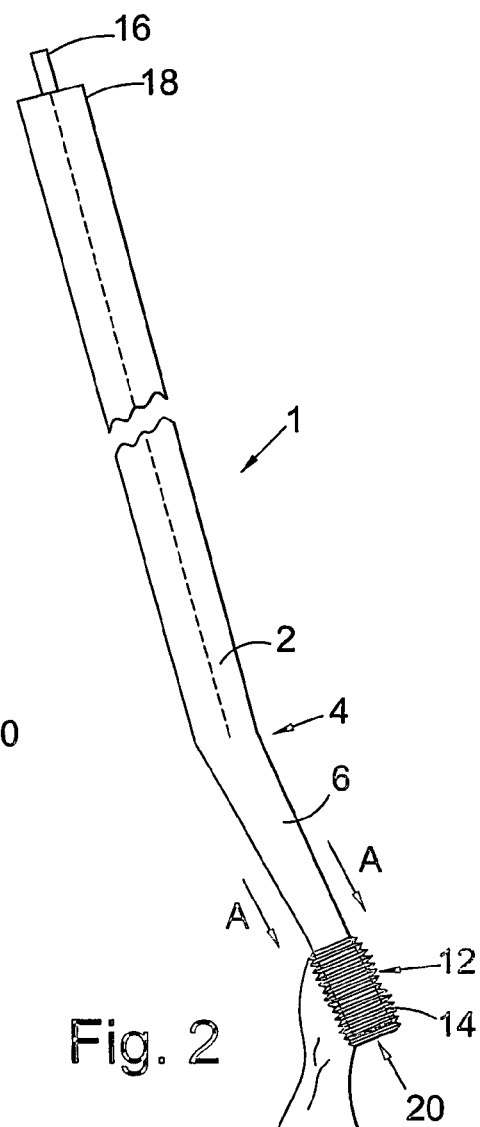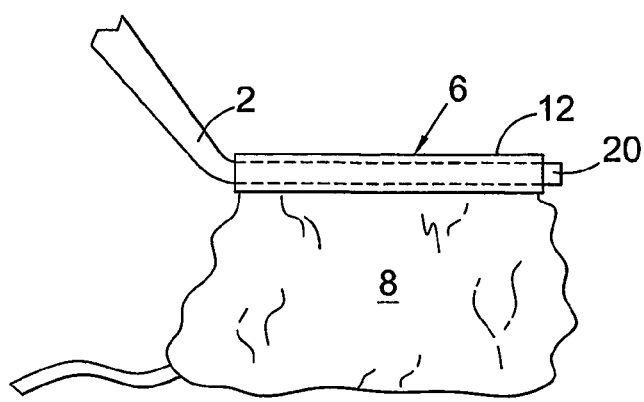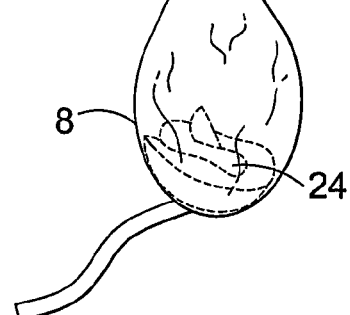

ANIMAL FAECES COLLECTOR DEVICE

BACKGROUND OF THE INVENTION

The present invention relates to an improved device for catching and containing animal faeces, particularly dog faeces.

SUMMARY OF THE INVENTION

International Publication No. WO 96/07317 (in the name of inventor John Charles Mark LANGLEY and assigned to the applicant for the present invention) discloses a dog faeces collector which has significant practical and economic advantages over previously known dog faeces collectors. The device disclosed in WO 96/07317 describes a device having a collapsible elongate handle provided at a distal end with a receptacle having an upwardly facing deposition surface which, in a deployed condition, is formed and arranged for receiving a faecal deposit. The elongate handle is formed and arranged so as to be collapsible into a highly compact pocketable form in a collapsed state of the device and can be deployed to a substantially self-supporting state in a deployed empty state of the device. In particular the invention is based upon the recognition, for the first time, that the handle and receptacle support means may have a load bearing capability just sufficient for bearing, in cantilevered support, an empty receptacle and which is substantially insufficient for bearing, in cantilevered support, the turning moment exerted by the faecally loaded receptacle. In a preferred embodiment described in WO 96/07317 the handle and receptacle support means are inflatable.

WO 96/07317 describes the use of a "security means" in the form of a closure means such as a cover or, preferably, a draw string or like means for drawing in together the rim or support means of the receptacle over the contents (faeces) of the receptacle. In the specific embodiment described therein the draw string passes down through the handle and around the inflated receptacle support such that when the draw string is pulled the rim portion for supporting the receptacle "draws the center portion 12 of the tube 2 together so as to cover over the contents 32 of the bag 14 sealing them inside so that a user may safely and hygienically dispose of the device 1 and the contents contained therein".

What the inventor of the present invention has identified is that whilst the arrangement described above and in WO 96/07317 functions perfectly well, from a manufacturing and economic point of view use of an additional component part, in the form of a drawstring, is less than desirable.

It is an object of the present invention to avoid or minimize one or more of the foregoing limitations.

The present invention provides an animal faeces collector device comprising a collapsible elongate handle means provided at a distal end with a receptacle support means supporting a receptacle having an upwardly facing deposition surface in a deployed condition of the device for receiving a faecal deposit thereon, said elongate handle means and said receptacle support means being formed and arranged for supporting the receptacle in empty and faecally loaded conditions thereof, and said elongate handle means, said receptacle support means and said receptacle being formed and arranged so as to be collapsible into a highly compact pocketable form in a collapsed state of the device, and to be deployable to a substantially self supporting state in a deployed empty state of the device, said device being of lightweight form of construction with said handle means and said receptacle support means formed and arranged so as to have a load bearing capability, at least in use of the device, which is just sufficient for bearing, in cantilevered support, the turning moment exerted by said handle means and said receptacle in an empty condition for enabling substantially positive remote manipulation of said empty receptacle into a faeces-receiving position on the ground substantially below an animal's anus in use of the device; said handle means and receptacle support means being formed and arranged with a tensile strength and substantially restricted rigidity and a lightness of construction, to maximize collapsibility into a highly compact pocketable form and to facilitate easy and economic disposability of the device, and which load bearing capability is substantially insufficient for bearing, in cantilevered support, the turning moment exerted by the receptacle in a faecally loaded condition thereof; whilst enabling the receptacle to be captively suspended in a faecally loaded condition thereof by said handle means for conveyance of the faecally loaded device to a disposal site, in use of the device, characterized in that in said deployed condition of the device said receptacle is supported substantially equally around the receptacle support means by a rim portion and that said rim portion of said receptacle may move on said receptacle support means from a first position with said deposition surface of said receptacle in said upwardly facing orientation to a second position on a portion of said receptacle support means with said deposition surface loaded with faeces and the rim portion of said receptacle collected together over the contents of the receptacle.

Thus with the animal faeces collector device according to the present invention the weight of faeces contained within the receptacle causes the rim portion of the receptacle to slide down on the receptacle support means when the device is suspended in a faecally loaded condition.

Preferably said device is formed and arranged so as to be inflatable from said collapsed state to said substantially self-supporting state. For example, the elongate handle portion may comprise a single elongate inflatable tube, or a plurality of elongate inflatable tubes, in side by side relation.

Desirably said receptacle is supported equally around the receptacle support means by said rim portion such that it may move from said first position to said second position in an inflated, deflated or partially deflated condition of the device.

Preferably said elongate handle portion and said receptacle support means are inflatable and are in fluid communication with each other so as to permit inflation of both the handle portion and the receptacle support means by one use of one inflation means. The inflation means may comprise, for example, the user blowing into a mouthpiece located at the top end of the handle, remote from the receptacle support.

Preferably the receptacle is provided with a foot engagement portion, for engaging with the underside of a user's foot so as to allow the raising of the handle and the receptacle support means up from the ground (whilst retaining the receptacle substantially on the ground) so that the receptacle slides from said first position where it is supported equally around the receptacle support means to said second position wherein the rim portion of the receptacle collects together over the contents of receptacle and is supported on only a portion of said receptacle support means (which may be in an inflated, deflated or partially deflated state).

Preferably there is used in the construction of the inflatable device, a light, flexible, waterproof material such as plastic sheet material for instance polyvinylchloride, polyamide, polyalkene, polyethylene. Desirably there is used a biodegradable material to facilitate environmentally acceptable disposable of the closed receptacle with the faecal matter contained therein.

Preferably said deposition surface when in said deployed condition has a diameter of from 5 cm to 30 cm, desirably 10 cm to 20 cm, though it will be appreciated that the size and shape required will depend to a large extent on the size of the dog and of the faecal deposits generally produced by such a dog. Various shapes of deposition surface may be used, for example, circular, oval, triangular or sectoral. It will be appreciated that the shape of the deposition surface will be dictated substantially by the shape of the receptacle support means.

BRIEF DESCRIPTION OF THE DRAWINGS

Further preferred features and advantages of the present invention will appear from the following detailed description given by way of example of a preferred embodiment illustrated with reference to the accompanying drawings in which:—

FIG. 1–1a is a perspective view of a dog faeces collector device in an inflated self supporting state; and FIG. 2 is a perspective view of the device after use in a collapsed condition.

DETAILED DESCRIPTION OS THE PREFERRED EMBODIMENT

Reference is first made to FIG. 1 and FIG. 1a which shows a dog faeces collector device of the invention generally indicated by reference number 1. In more detail the device 1 comprises a collapsible elongate handle 2 provided at a distal end 4 with a receptacle support ring 6 (shown partially in dashed line) for supporting a receptacle 8 having an upwardly facing deposition surface 10. The handle 2 and the receptacle support ring are formed from two inflatable tubes. In the inflated condition shown in FIG. 1 the receptacle 8 is supported on the receptacle support ring 6 by a rim portion 12. In more detail the rim portion 12 of the receptacle 8 comprises an elongate tube 14 which runs around the top of the receptacle 8 and through which said receptacle support ring 6 passes. The rim portion 12 is not fixed to the receptacle support ring 6 but may move slidably thereon (likened to a curtain on a curtain rail). In the inflated condition shown in FIG. 1 the receptacle 8 is supported equally around the receptacle support ring 6 by the rim portion 12 so as to define the deposition surface 10 on the receptacle 8.

The handle 2 and receptacle support ring 6 comprise two inflatable tubes which are inflated through a mouthpiece 16 at the top 18 of the handle 2. The handle 2 itself comprises two side by side tubes (indicated by a dashed line) which at the distal end 4 of the handle 2 split to form the receptacle support ring 6. The ends of both tubes are connected together 20.

Also shown in FIG. 1 is a foot engagement strap 22 which is attached to the receptacle 8. The foot engagement strap 22 provides a means for holding the receptacle 8 down whilst the handle 2 is pulled upwardly thereby causing the receptacle support ring 6 to be partially withdrawn from within the rim portion 12 of the receptacle 8 and thereby causing the rim portion 12 to collect together and slide down (shown by arrows A in FIG. 2) over the receptacle support ring 6 towards the portion 20 where the two inflatable tubes of the receptacle support ring 6 are joined. The receptacle 8 is then captively held by the end of the support ring 6.

FIG. 2 shows the device of FIG. 1 with faeces 24 contained within the receptacle 8 and the rim portion 12 of the receptacle 8 collected in on itself (like an open curtain) covering over the contents and being supported at the end of the receptacle support ring 6 (which may be in an inflated, partially inflated or deflated condition).

Various modifications may be made to the above-described embodiment without departing from the scope of the present invention.

The invention claimed is:

1. An animal faeces collector device (1) comprising a collapsible elongate handle means (2) provided at a distal (4) end with a receptacle support means (6) supporting a receptacle (8) having an upwardly facing deposition surface (10) in a deployed condition of the device for receiving a faecal deposit (24) thereon, said elongate handle means (2) and said receptacle support means (6) being formed and arranged for supporting the receptacle (8) in empty and faecally loaded conditions thereof, and said elongate handle means (2), said receptacle support means (6) and said receptacle (8) being formed and arranged so as to be collapsible into a highly compact pocketable form in a collapsed state of the device, and to be deployable to a substantially self supporting state in a deployed empty state of the device, said device being of lightweight form of construction with said handle means (2) and said receptacle support means (6) formed and arranged so as to have a load bearing capability, at least in use of the device, which is just sufficient for bearing, in cantilevered support, the turning moment exerted by said handle means (2) and said receptacle (8) in an empty condition for enabling substantially positive remote manipulation of said empty receptacle (8) into a faeces-receiving position on the ground substantially below an animal's anus in use of the device; said handle means (2) and receptacle support means (6) being formed and arranged with a tensile strength and substantially restricted rigidity and a lightness of construction, to maximize collapsibility into a highly compact pocketable form and to facilitate easy and economic disposability of the device, and which load bearing capability is substantially insufficient for bearing, in cantilevered support, the turning moment exerted by the receptacle (8) in a faecally loaded condition thereof; whilst enabling the receptacle (8) to be captively suspended in a faecally loaded condition thereof by said handle means (2) for conveyance of the faecally loaded device to a disposal site, in use of the device, characterized in that in said deployed condition of the device said receptacle (8) is supported substantially equally around the receptacle support means (6) by a rim portion (12) and that said rim portion (12) of said receptacle (8) may move on said receptacle support means (6) from a first position with said deposition surface (10) of said receptacle (8) in said upwardly facing orientation to a second position on a portion of said receptacle support means (6) with said deposition surface (10) loaded with faeces (24) and the rim portion of said receptacle (12) collected together over the contents of the receptacle (8).

2. An animal faeces collector device as claimed in claim 1 wherein said device (1) is formed and arranged so as to be inflatable from said collapsed state to said substantially self-supporting state.

3. An animal faeces collector device (1) as claimed in claim I wherein said elongate handle means (2) and said receptacle support means (6) are inflatable and are in fluid communication with each other.

4. An animal faeces collector device (1) as claimed in claim 1 wherein the receptacle (8) is provided with a foot engagement portion (22). formed and arranged for engaging, in use, with the underside of a user's foot so as to allow the raising of said elongate handle means (2) and the receptacle support means (6) up from the ground.

5. An animal faeces collector device (1) as claimed in claim 2 wherein the material used in the construction of said inflatable device is of a light, flexible, waterproof plastic sheet material selected from the group including polyvinylchloride, polyamide, polyalkene or polyethylene.

6. An animal faeces collector device (1) as claimed in claim 2 wherein the material used in the constriction of said inflatable device is biodegradable.

7. An animal faeces collector device (1) as claimed in claim 1 wherein said deposition surface (10) when in said deployed condition has a diameter of from 5 cm to 30 cm.

8. An animal faeces collector device (1) as claimed in claim 1 wherein said deposition surface (10), when in said deployed condition has a diameter of from 10 to 20 cm.

9. An animal faeces collector device (1) as claimed in claim 1 wherein said elongated handle means (2) and receptacle support means (6) comprises two inflatable tubes inflatable through a mouthpiece. (16) at the top end (18) of said handle.

* * * * *